(12) United States Patent
Kim et al.

(10) Patent No.: US 12,246,691 B2
(45) Date of Patent: Mar. 11, 2025

(54) BRAKE SYSTEM

(71) Applicants: HYUNDAI MOTOR COMPANY, Seoul (KR); KIA CORPORATION, Seoul (KR)

(72) Inventors: Eun Sik Kim, Gwangmyeong-si (KR); Soo Hyuk Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 887 days.

(21) Appl. No.: 17/376,635

(22) Filed: Jul. 15, 2021

(65) Prior Publication Data

US 2022/0048479 A1 Feb. 17, 2022

(30) Foreign Application Priority Data

Aug. 14, 2020 (KR) .................. 10-2020-0102362

(51) Int. Cl.
*B60T 7/04* (2006.01)
*B60T 8/40* (2006.01)
*B60T 13/68* (2006.01)
*B60T 13/74* (2006.01)

(52) U.S. Cl.
CPC ............ *B60T 7/042* (2013.01); *B60T 8/4077* (2013.01); *B60T 13/686* (2013.01); *B60T 13/745* (2013.01); *B60T 8/4081* (2013.01); *B60T 2220/04* (2013.01)

(58) Field of Classification Search
CPC .. B60T 2220/04; B60T 13/745; B60T 13/686; B60T 7/042; B60T 8/4077; B60T 8/4081
See application file for complete search history.

(56) References Cited

U.S. PATENT DOCUMENTS

| | | | | |
|---|---|---|---|---|
| 5,602,732 A * | 2/1997 | Nichols | ............. | G01D 3/08 123/376 |
| 6,147,600 A * | 11/2000 | Faye | ............. | B60W 30/16 340/463 |
| 10,081,297 B1 * | 9/2018 | Yelda | ............. | H05B 45/10 |
| 10,926,694 B2 | 2/2021 | Park | | |

(Continued)

FOREIGN PATENT DOCUMENTS

| | | |
|---|---|---|
| CN | 111216698 A | 6/2020 |
| JP | 2013071714 A | 4/2013 |

(Continued)

OTHER PUBLICATIONS

Office Action cited in Korean patent application No. 10-2020-0102362; Nov. 11, 2024; 22 pp.

*Primary Examiner* — Bradley T King
(74) *Attorney, Agent, or Firm* — Lempia Summerfield Katz LLC (57) ABSTRACT

A brake system includes a stroke sensor to output a detection signal indicative of a status of a stroke of a brake pedal, and a first controller to receive the detection signal and to generate a switching signal in accordance with a displacement of the brake pedal based on a result of comparing the detection signal with a predetermined reference value. In particular, the switching signal is provided to at least one second controller configured to control an operation of another device in a vehicle based on an operation of the brake pedal.

20 Claims, 5 Drawing Sheets

(56) References Cited

U.S. PATENT DOCUMENTS

| | | | |
|---|---|---|---|
| 2005/0216134 A1* | 9/2005 | Katrak | B60N 11/0818 701/1 |
| 2007/0215401 A1* | 9/2007 | Braeuchle | B60W 30/18054 180/170 |
| 2009/0306845 A1* | 12/2009 | Dang Van Nhan | B60T 7/042 706/46 |
| 2010/0145559 A1* | 6/2010 | Gauthier | B60W 10/06 903/902 |
| 2010/0241330 A1* | 9/2010 | Hartmann | B60T 8/344 701/70 |
| 2013/0211661 A1* | 8/2013 | Kirsch | B60W 50/0205 701/30.3 |
| 2013/0213034 A1* | 8/2013 | Leiber | B60T 7/042 60/327 |
| 2014/0142813 A1* | 5/2014 | O'Leary | G06F 11/30 701/33.4 |
| 2014/0152085 A1* | 6/2014 | Biller | B60T 13/58 303/14 |
| 2014/0288798 A1* | 9/2014 | Ando | F02N 11/0818 701/93 |
| 2015/0028785 A1* | 1/2015 | Tang | B60W 50/038 318/434 |
| 2015/0175010 A1* | 6/2015 | Tang | H02H 7/08 701/22 |
| 2015/0203116 A1* | 7/2015 | Fairgrieve | B60T 8/175 701/93 |
| 2018/0065611 A1* | 3/2018 | Matsuura | B60T 8/171 |
| 2018/0105156 A1* | 4/2018 | Kishi | B60T 13/745 |
| 2020/0055445 A1 | 2/2020 | Park | |
| 2020/0148187 A1* | 5/2020 | Henson | B60T 17/221 |
| 2020/0207318 A1* | 7/2020 | Dettman | B60T 10/04 |
| 2020/0276964 A1* | 9/2020 | Goto | B60T 13/04 |
| 2021/0053540 A1* | 2/2021 | Besier | B60T 8/885 |
| 2021/0109560 A1* | 4/2021 | Ford | B60K 20/04 |
| 2022/0055582 A1* | 2/2022 | Takimoto | G01R 33/072 |
| 2022/0080935 A1* | 3/2022 | Terada | B60T 8/92 |
| 2023/0174036 A1* | 6/2023 | Saotome | B60T 13/58 701/78 |
| 2023/0192040 A1* | 6/2023 | Schaust | F16C 1/145 188/358 |
| 2023/0192139 A1* | 6/2023 | Kumavat | B60W 50/023 701/25 |
| 2023/0211764 A1* | 7/2023 | Toelge | B60T 8/172 303/6.01 |
| 2024/0140434 A1* | 5/2024 | Abe | B60W 30/143 |

FOREIGN PATENT DOCUMENTS

| | | |
|---|---|---|
| KR | 10-2012-0086554 | 8/2012 |
| KR | 10-2013-0013998 | 2/2013 |
| KR | 10-2017-0118524 | 10/2017 |
| KR | 20200020027 A | 2/2020 |

* cited by examiner

BRAKE SYSTEM

CROSS REFERENCE TO RELATED APPLICATION

The present application claims priority to and the benefit of Korean Patent Application No. 10-2020-0102362, filed on Aug. 14, 2020, the entire contents of which are incorporated herein by reference.

FIELD

The present disclosure relates to a brake system.

BACKGROUND

The statements in this section merely provide background information related to the present disclosure and may not constitute prior art.

In general, in a brake system applied to a vehicle, a brake pedal receiving an input from a driver includes a stop lamp switch for operating a stop lamp of the vehicle.

Generally, the stop lamp switch outputs a first output signal having a low value before the brake pedal is operated and a having a high value when the brake pedal is operated and a second output signal having a high value before the brake pedal is operated and having a low value when the brake pedal is operated. These first and second output signals are provided to various controllers that control other devices in the vehicle and used to control operations of the other devices according to whether the brake pedal is operated.

Meanwhile, the brake pedal of the vehicle also includes a stroke sensor that detects an operation amount of a brake, i.e., a stroke of the brake. A stroke detection signal output from the stroke sensor is mainly applied to determine a brake force (hydraulic pressure) of a brake system including an integrated electric booster.

As described above, in the brake system of the related art, a switch and a sensor capable of determining whether the brake is operated are redundantly used, increasing a cost of the vehicle. In particular, the stop lamp switch should be wired with a plurality of controllers in the vehicle to transmit signals to each of the controllers, which adversely affects a layout configuration for the arrangement of parts in the vehicle, and since whether the brake pedal is operated is simply determined, it is not possible to provide an appropriate degree of a brake operation required for the plurality of controllers.

The contents described as the related art have been provided only to assist in understanding the background of the present disclosure and should not be considered as corresponding to the related art known to those having ordinary skill in the art.

SUMMARY

The present disclosure provides a brake system capable of generating a signal corresponding to an output signal of a stop lamp switch from an output signal of a stroke sensor installed at a brake pedal, without the stop lamp switch provided in the brake pedal of the related art.

According to one form of the present disclosure, a brake system includes: a stroke sensor configured to output a detection signal of detecting a stroke of a brake pedal; and a first controller configured to receive the detection signal and to generate a switching signal in accordance with a displacement of the brake pedal based on a result of comparing the detection signal with a predetermined reference value, wherein the switching signal is provided to at least one second controller configured to control an operation of another device in a vehicle based on an operation of the brake pedal.

In another form of the present disclosure, the first controller may be connected to the stroke sensor by wiring to receive the detection signal, and the second controller may be connected to the first controller by a controller area network (CAN) to receive the switching signal.

In one form of the present disclosure, the detection signal may include a first channel signal whose duty linearly decreases from a maximum duty to a minimum duty and a second channel signal whose duty linearly increases from the minimum duty to the maximum duty according to an increase in the stroke of the brake pedal, and the first channel signal and the second channel signal may be in a complementary relation based on a duty of 50%.

In other form of the present disclosure, the reference value may include a first reference value and a second reference value in a complementary relation based on the duty of 50%, and the first controller may be configured to generate a first switching signal transitioning from a high state to a low state based on a result of comparing the first channel signal with the first reference value and to generate a second switching signal transitioning from a low state to a high state based on a result of comparing the second channel signal with the second reference value.

In one form of the present disclosure, the first controller may be configured to generate a first switching signal transitioning from a high state to a low state based on a result of comparing the first channel signal with the reference value and to generate a second switching signal by reversing the first switching signal.

In one form of the present disclosure, the first controller may be configured to generate a second switching signal transitioning from a low state to a high state based on a result of comparing the second channel signal with the reference value and to generate a first switching signal by reversing second switching signal.

In an exemplary form of the present disclosure, the reference value may include a plurality of reference values different for each of the at least one second controller.

In another exemplary form of the present disclosure, the plurality of reference values may be determined based on the stroke of the brake pedal required for controlling performed in the second controller.

In other form of the present disclosure, the first controller or the second controller may include an integrated electric booster (IEB) controller configured to determine whether a brake system is abnormal, and the IEB controller may determine whether the brake system is abnormal based on at least one of the detection signal, an output signal of a pressure sensor configured to detect a change in an oil pressure of a fluid in accordance with movement of a piston of a cylinder in the brake system, and an output signal of a solenoid valve current sensor configured to detect a current flow of a solenoid valve provided at a flow path of the fluid of the brake system.

According to another form of the present disclosure, a brake system includes: a stroke sensor configured to output, a result of detecting a stroke of a brake pedal, as a first channel signal whose duty linearly decreases from a maximum duty to a minimum duty and a second channel signal whose duty linearly increases from the minimum duty to the maximum duty according to an increase in the stroke of the brake pedal; a first controller configured to generate a first switching signal transitioning from a high state to a low state and a second switching signal transitioning from a low state to a high state according to a result of comparing at least one of the first channel signal and the second channel signal with a predetermined reference value; and at least one second controller configured to control an operation of another device in a vehicle based on an operation of the brake pedal upon receiving at least one of the first switching signal and the second switching signal.

In one form of the present disclosure, the first controller is connected to the stroke sensor by wiring to receive at least one of the first channel signal and the second channel signal, and the second controller is connected to the first controller by a controller area network (CAN) to receive at least one of the first switching signal and the second switching signal.

In an exemplary form of the present disclosure, the first channel signal and the second channel signal may be in a complementary relation based on a duty of 50%.

In an exemplary form of the present disclosure, the reference value may include a first reference value and a second reference value in a complementary relation based on the duty of 50%, and the first controller may be configured to generate a first switching signal based on a result of comparing the first channel signal with the first reference signal and to generate a second switching signal based on a result of comparing the second channel signal with the second reference value.

In an exemplary form of the present disclosure, the first controller may be configured to generate the first switching signal based on a result of comparing the first channel signal with the first reference value and to generate the second switching signal by reversing the first switching signal.

In an exemplary form of the present disclosure, the first controller may be configured to generate the second switching signal based on a result of comparing the second channel signal with the second reference value and to generate a first switching signal by reversing second first switching signal.

In an exemplary form of the present disclosure, the reference value may include a plurality of reference values different for each of the at least one second controller.

In an exemplary form of the present disclosure, the plurality of reference values may be determined based on the stroke of the brake pedal required for controlling performed in the second controller.

In an exemplary form of the present disclosure, the first controller or the second controller may include an integrated electric booster (IEB) controller configured to determine whether a brake system is abnormal, and the IEB controller may determine whether the brake system is abnormal based on at least one of the detection signal, an output signal of a pressure sensor configured to detect a change in an oil pressure of a fluid in accordance with movement of a piston of a cylinder in the brake system, and an output signal of a solenoid valve current sensor configured to detect a current flow of a solenoid valve provided at a flow path of the fluid of the brake system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a brake system according to various exemplary forms will be described in detail with reference to the accompanying drawings.

Figure 1:
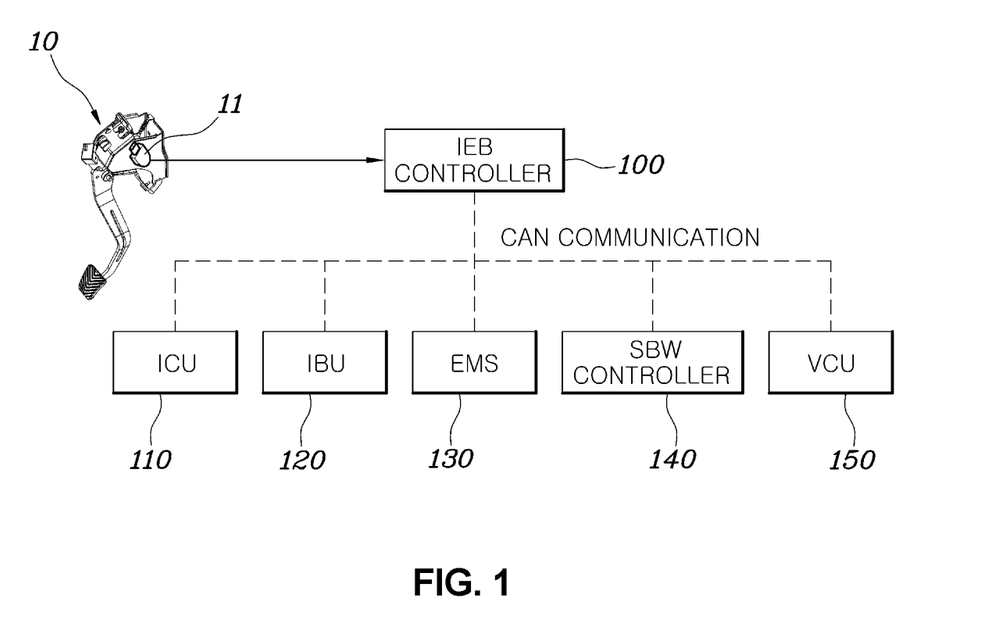
FIG. 1 is a view illustrating a configuration of a brake system according to an exemplary form of the present disclosure.

FIG. 1 is a view illustrating a configuration of a brake system according to an exemplary form of the present disclosure.

Referring to FIG. 1, the brake system may include a stroke sensor 11 outputting a detection signal that detects a stroke of a brake pedal 10 and a first controller 100 receiving the detection signal from the stroke sensor 11, comparing the received detection signal with a predetermined reference value, and generating a switching signal in accordance with a displacement of the brake pedal 10 based on a comparison result.

The stroke sensor 11 may be mounted on the brake pedal 10 and output the detection signal corresponding to the stroke in accordance with a driver's brake operation, i.e., a displacement of the brake pedal 10. A controller (integrated electronic booster controller 100 in FIG. 1) that controls the operation of the brake in a vehicle may detect the driver's braking intention upon receiving the detection signal.

The first controller 100 may receive the detection signal corresponding to a size of the stroke of the brake pedal 10 from the stroke sensor 11 and generates a switching signal in accordance with a displacement of the brake pedal using the received detection signal.

The first controller 100 may be connected to the stroke sensor 11 by wiring to receive the detection signal from the stroke sensor 11.

In various forms of the present disclosure, the first controller 100 may be an integrated electric booster (IEB) 100 calculating a brake pressure based on the detection signal input from the stroke sensor 11 and driving an electric motor so that the pressure in the master cylinder becomes the calculated brake pressure.

The switching signal generated by the first controller 100 may receive a switching signal corresponding to the operation of the brake pedal and provide the received switching signal to second controllers 110 to 150 which are other controllers controlling another device or part in the vehicle. The first controller 100 and the second controllers 110 to 150 may communicate through a controller area network (CAN) provided for communication between the controllers inside the vehicle.

For example, the second controller may include an integrated central control unit (ICU) 110 that recognizes the switching signal which has detected the operation of the brake pedal and controls ON/OFF of a stop lamp of the vehicle displaying an operation of the brake pedal.

In addition, the second controller may include an integrated body control unit (IBU) 120 that recognizes the switching signal which has detected the operation of the brake pedal and performs vehicle start control so that the vehicle may be started only when the brake pedal is operated.

In addition, the second controller may include an engine management system (EMS) 130 that recognizes the switching signal which has detected the operation of the brake pedal and releases a cruise control execution of the vehicle and controls an idle stop and go (ISG) function.

In addition, the second controller may include a shift by wire (SBW) controller 140 that releases shift lock of a transmission by recognizing the switching signal which has detected the operation of the brake pedal.

In addition, the second controller may include a vehicle control unit (VCU) 150 incorporating the functions of the EMS 130 and the SBW controller 140.

In FIG. 1, the EMS 130, the SBW controller 140, and the VCU 150 are all illustrated for convenience of description, and in the case of real vehicles, an internal combustion engine vehicle or a hybrid vehicle mainly having an engine include the EMS 130 and the SBW controller 140 and an electric vehicle that does not have an engine and generates power using an electric motor may include the VCU 150.

Figure 2:
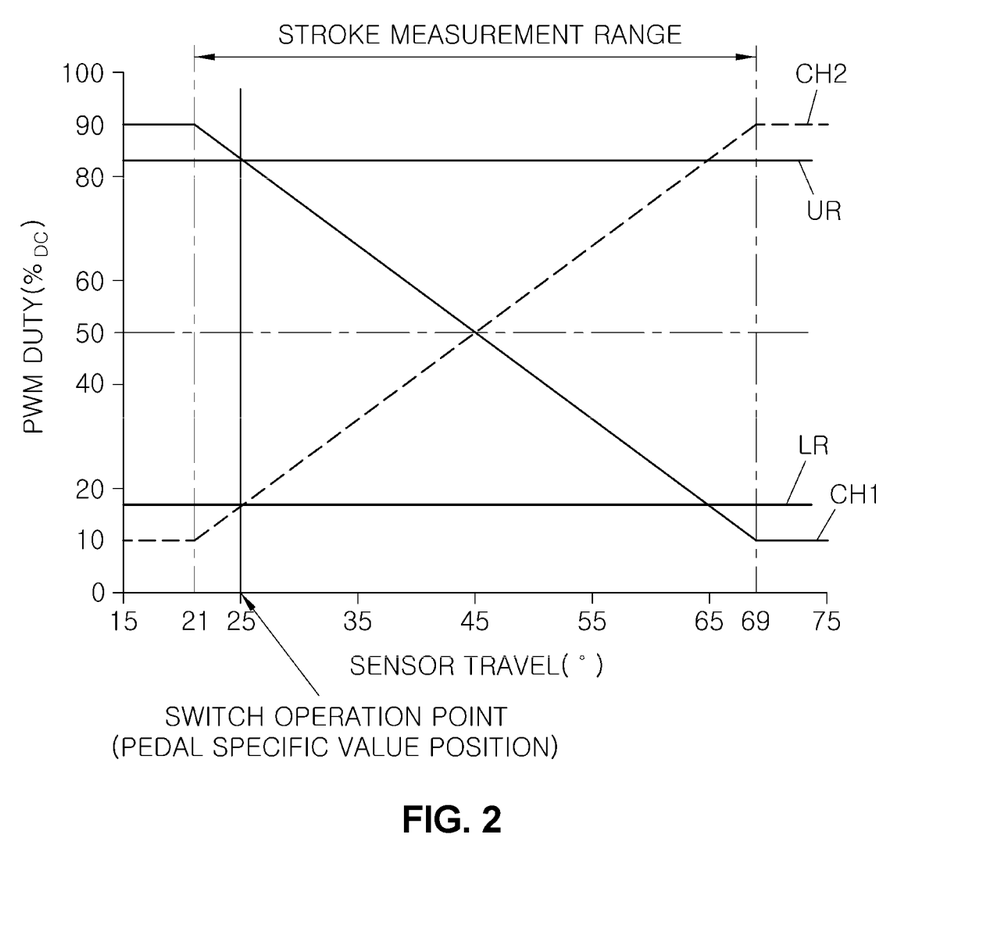
FIG. 2 is a view illustrating an example of a detection signal output from a stroke sensor in a brake system according to an exemplary form of the present disclosure.

FIG. 2 is a view illustrating an example of a detection signal output from a stroke sensor in a brake system according to an exemplary form of the present disclosure.

As shown in FIG. 2, the stroke sensor 11 may output one signal whose duty linearly decreases from a maximum duty (90% duty in FIG. 2) to a minimum duty (10% duty in FIG. 2) and another signal whose duty linearly increases from the minimum duty to the maximum duty according to a displacement, i.e., the stroke, of the brake pedal 10 increases. That is, the stroke sensor 11 may output a detection signal including a first channel signal CH1 whose duty decreases as the stroke increases and a second channel signal CH2 whose duty increases as the stroke increases.

Here, the duty refers to a rate at which a high state (HIGH) appears in a pulse signal, and the maximum duty and the minimum duty may be in a complementary relation based on a duty of 50%. That is, a size between the maximum duty and the 50% duty and a size between the minimum duty and the 50% duty are the same, and the first channel signal CH1 and the second channel signal CH2 may be in a complementary relation based on the 50% duty.

As shown in FIG. 2, the first controller 100 may compare the detection signal of the stroke sensor 11 with a predetermined reference value (UR or LR) and generate a switching signal according to a result thereof.

Figure 3:
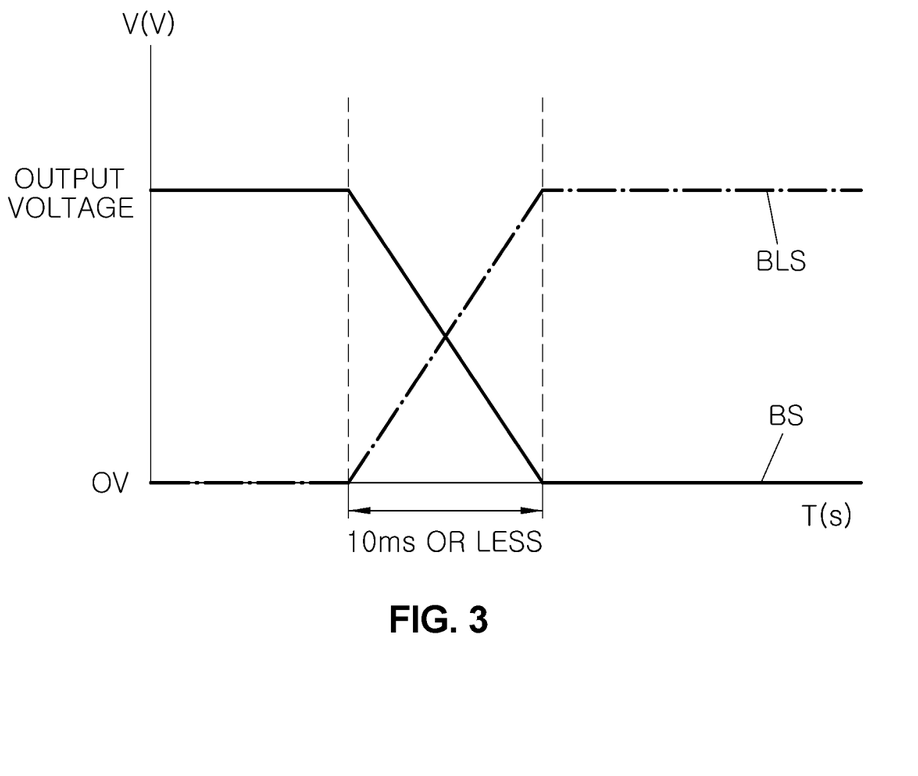
FIG. 3 is a view showing an example of a switching signal generated in a brake system according to an exemplary form of the present disclosure.

FIG. 3 is a view showing an example of a switching signal generated in a brake system according to another form of the present disclosure.

Referring to FIG. 3, the first controller 100 may compare the first channel signal CH1 output from the stroke sensor 11 with a predetermined first reference value UR, and generate one switching signal BS indicating a high state if the first channel signal CH1 larger than the first reference value UR and indicating a low state if the first channel signal CH1 is smaller than or equal to the first reference value UR.

In addition, the first controller 100 may compare the second channel signal CH2 output from the stroke sensor 11 with a predetermined second reference value LR, and generate another switching signal BLS indicating a high state if the second channel signal CH2 is larger than the second reference value LR and indicating a low state if the second channel signal CH2 is smaller than or equal to the second reference value LR.

Here, the first reference value UR and the second reference value LR are reference values that are determined in advance to determine that a force to step on the brake pedal acts or that a force to step on the brake pedal is released. This reference value may be determined based on a size of a stroke that may be determined as the force to step on the brake pedal acts. For example, if a switching signal is to be generated even when a small amount of force of stepping on the brake pedal acts, a duty corresponding to a lower stroke may be determined as a reference value as shown in FIG. 2, and since the first channel signal CH1 and the second channel signal CH2 are in a complementary relation based on the 50% duty, the first reference value UR and the second reference value LR may be values having the same size difference based on the 50% duty.

As another example, the first controller 100 may compare the first channel signal CH1 output from the stroke sensor 11 with the predetermined first reference value UR and generate one switching signal BS indicating a high state if the first channel signal CH1 is larger than the first reference value UR and indicating a low state if the first channel signal CH1 is smaller than or equal to the first reference value UR, and generate another switching signal BLS in a manner of applying the generated switching signal BS to an inverting logic element or the like to generate an inversion signal thereof. In this case, two switching signals may be generated with only one reference value.

Similarly, the first controller 100 may compare the second channel signal CH2 output from the stroke sensor 11 with the predetermined second reference value LR and generate one switching signal BLS indicating a high state if the second channel signal CH2 is larger than the second reference value LR and indicating a low state if the second channel signal CH2 is smaller than or equal to the second reference value LR, and generate another switching signal BS in a manner of applying the generated switching signal BLS to an inverting logic element or the like to generate an inversion signal thereof. Also, in this case, two switching signals may be generated with only one reference value.

In FIG. 3, a period in which the states of the two switching signals BS and BLS transition from high to low or from low to high is a period in which delay or the like occurs in a circuit operation, which is actually a very short time (e.g., 1/100 second or less), so it may be ignored.

Figure 4:
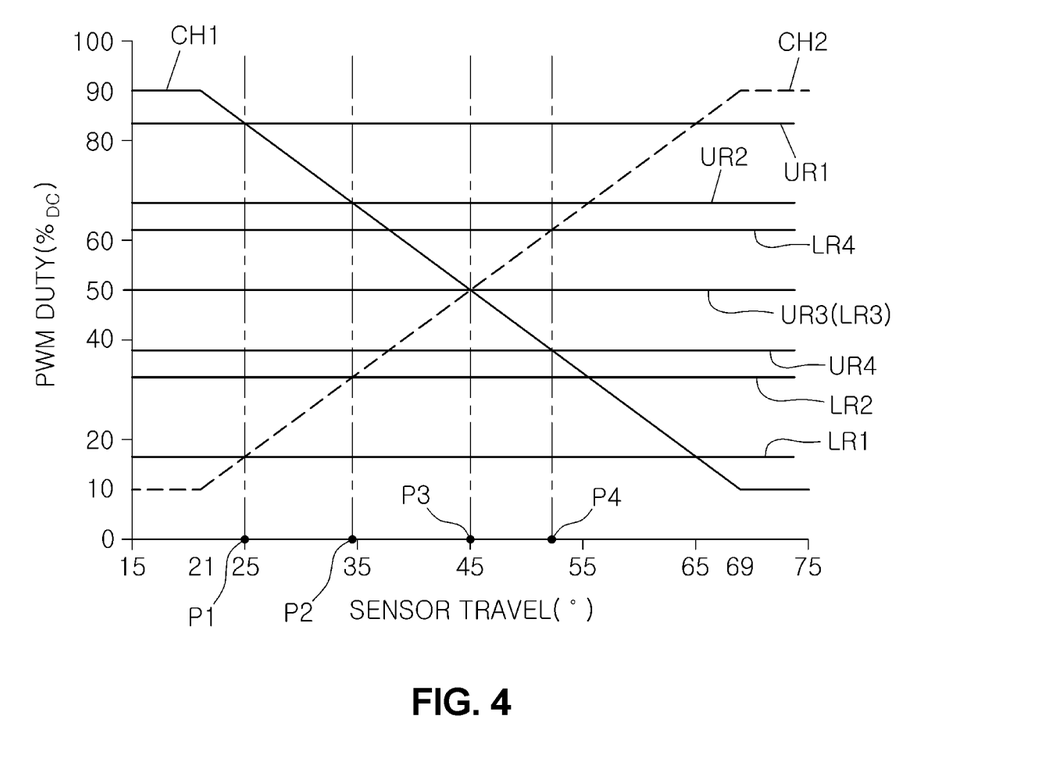
FIG. 4 is a view illustrating an example of applying different reference signals for each type of a second controller in a brake system according to an exemplary form of the present disclosure.

FIG. 4 is a view illustrating an example of applying different reference signals for each type of a second controller in a brake system according to an exemplary form of the present disclosure.

As described above, as for a reference value for determining a force of stepping on the brake pedal, a stroke reference may be set to be various as desired.

Referring to FIG. 4, the first controller 100 may generate switching signals provided to the second controllers 110 to 150, respectively, based on different reference values UR1 to UR4 and LR1 to LR4.

For example, a switching signal transmitted by the first controller 100 to the ICU 110 in order to determine whether a stop lamp of the vehicle is turned on may be determined such that the stop lamp can be turned on in a state P1 where a stroke of the brake pedal is smallest. In this case, the first reference value UR1 compared with the first channel signal CH1 of the stroke sensor 11 may have the largest value, and a second reference value LR1 compared with the second channel signal CH2 may have the smallest value.

In addition, in the case of a switching signal transmitted by the first controller 100 to the EMS 130 or the VCU 150 to determine an operation time of an ISG function of the vehicle, the first reference value UR2 and the second reference value LR2 may be determined such that the ISG operates in a state P2 where a stroke sufficiently larger than the stroke for determining that the stop lamp is turned on.

In addition, in the case of a switching signal transmitted by the first controller 100 to the IBU 120 in order to determine whether the brake is stepped on when starting the vehicle, the first reference value UR3 and the second reference value LR3 may be determined such that determination may be made in a state P3 where a stroke sufficiently larger than the stroke for determining whether the ISG function occurs because a sufficient brake force must be secured when starting the vehicle.

In addition, in the case of a switching signal transmitted by the first controller 100 to the SBW controller 140 in order to determine whether to release shift lock of a transmission of the vehicle, the first reference value UR4 and the second reference value LR4 may be determined such that unlocking may be made in a state P4 where a stroke sufficiently larger than the stroke for determining whether the brake is stepped on because the vehicle can be safely stopped even when the vehicle is pushed or suddenly accelerated due to the shift of the transmission of the vehicle.

Meanwhile, the IEB controller 100 of the related art for controlling the operation of the brake system of the vehicle determines whether an abnormality occurs in the brake system of the vehicle, and if an abnormality occurs, a switching signal of a stop lamp switch is used to perform fail safe control of the brake system. In addition, the IEB controller 100 uses, as redundancy for determining whether the brake system is abnormal, a signal of the stroke sensor 11 and an output signal of a pressure sensor for detecting a change in a hydraulic pressure of a fluid in accordance with a movement of a piston of a cylinder in the brake system.

As described above, in the present disclosure, without using such a stop lamp switch installed at the brake pedal, the substantially same signal as a signal output from the stop lamp switch is generated from a stroke sensor signal. That is, in the present disclosure, since the signal corresponding to the signal of the stop lamp switch is produced from the output of the stroke sensor, additional redundancy that may replace the signal of the stop lamp switch is required to determine whether the brake system is abnormal.

Figure 5:
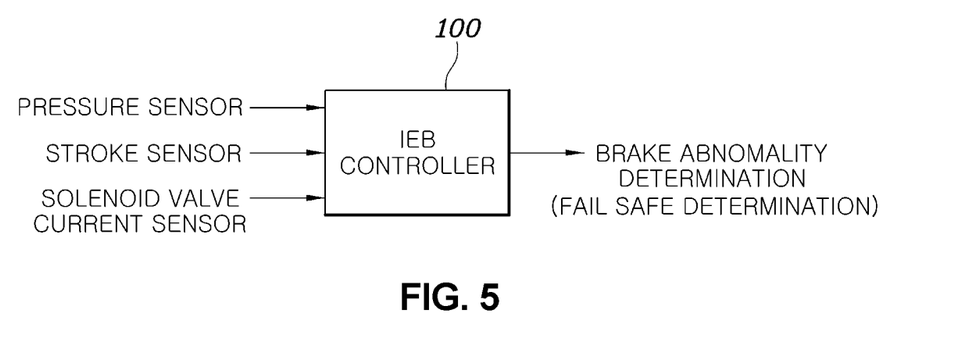
FIG. 5 is a view illustrating an operation of an IEB controller for determining abnormality of a brake system applied in the brake system according to an exemplary form of the present disclosure.

FIG. 5 is a view illustrating an operation of an IEB controller for determining an abnormality of the brake system applied in a brake system according to an exemplary form of the present disclosure.

As illustrated in FIG. 5, the IEB controller 100 may determine whether the brake system is abnormal upon receiving solenoid valve current information from a solenoid valve current sensor for detecting a current flow of a solenoid valve provided in the fluid flow path of the brake system.

For example, when the channel signal CH1 or CH2 detecting the stroke of the brake pedal is received from the stroke sensor 11, the IEB controller 100 may transmit a signal corresponding to an operation command to the solenoid valve of the brake system to change an operation current of the solenoid valve to operate the solenoid valve. If the solenoid valve current is not changed even though the IEB controller 100 transmits an operation command, it may be determined that an abnormality has occurred in the brake system. In this way, the IEB controller 100 may determine whether the brake system is abnormal upon receiving a sensing value of the current sensor that detects the current of the solenoid valve. The brake system may include a plurality of solenoid valves for supplying hydraulic pressure, and the solenoid valve applied as redundancy for the IEB controller 100 to determine an abnormality of the brake system may be a certain solenoid valve operated by an operation command of the IEB controller 100.

In the above, an example of generating a switching signal while the IEB controller 100 connected by wiring with the stroke sensor 11 provided in the brake pedal 10 operates as the first controller has been described. However, the present disclosure is not limited thereto, and the IEB controller 100 may be wired with the stroke sensor 11 and replaced with another controller capable of performing CAN communication with the second controller within the scope of the present disclosure. For example, if a foldable pedal requiring mechanical and electrical control for a physical movement of the brake pedal is applied as a brake pedal, a foldable pedal controller for controlling the foldable pedal may operate as the first controller. In this case, the IEB controller 100 may operate as a second controller that receives a switching signal created by the foldable pedal controller based on a detection signal of the stroke sensor.

As described above, the brake system according to various forms of the present disclosure may eliminate the wiring between the stop lamp switch and the various controllers of the vehicle by removing the stop lamp switch provided in the brake pedal of the related art, and thus, cost for the vehicle may be reduced and the degree of freedom in the layout of parts in the vehicle may be improved.

In addition, the brake system according to various forms of the present disclosure may eliminate a quality problem caused by failure of the stop lamp switch, thereby improving overall vehicle quality.

In addition, the brake system according to various forms of the present disclosure may generate a switching signal used for other controllers when the brake moves to a desired position by appropriately adjusting a reference value, thereby enabling precise vehicle control.

The effects obtainable in the present disclosure are not limited to the effects described above and other effects not mentioned are clearly understood by those skilled in the art from the following description.

Although the present disclosure has been shown and described with respect to the exemplary forms, it will be apparent to those having ordinary skill in the art that the present disclosure may be variously modified and altered without departing from the spirit and scope of the present disclosure.

What is claimed is:
1. A brake system for a vehicle, comprising:
a stroke sensor configured to output a detection signal indicative of a detected state of a stroke of a brake pedal; and
a first controller configured to: receive the detection signal, and generate a switching signal in accordance with a displacement of the brake pedal based on a result of comparing the detection signal with a predetermined reference value,
wherein the switching signal is provided to at least one second controller configured to control an operation of another device in the vehicle based on an operation of the brake pedal,
wherein:
the detection signal comprises: a first channel signal whose duty linearly decreases from a maximum duty to a minimum duty, and a second channel signal whose duty linearly increases from the minimum duty to the maximum duty according to an increase in the stroke of the brake pedal; and
the first controller is configured to generate a first switching signal transitioning from a high state to a low state based on a result of comparing the first channel signal with the reference value, or a second switching signal transitioning from a low state to a high state based on a result of comparing the second channel signal with the reference value.

2. The brake system of claim 1, wherein:
the first controller is connected to the stroke sensor by wiring to receive the detection signal, and the at least one second controller is connected to the first controller by a controller area network (CAN) to receive the switching signal.

3. The brake system of claim 1, wherein:
the first channel signal and the second channel signal are in a complementary relation based on a duty of 50%.

4. The brake system of claim 3, wherein:
the reference value comprises a first reference value and a second reference value in a complementary relation based on the duty of 50%, and
the first controller is configured to generate the first switching signal transitioning from the high state to the low state based on a result of comparing the first channel signal with the first reference value and configured to generate the second switching signal transitioning from the low state to the high state based on a result of comparing the second channel signal with the second reference value.

5. The brake system of claim 3, wherein:
the first controller is configured to generate the second switching signal by reversing the first switching signal.

6. The brake system of claim 3, wherein:
the first controller is configured to generate the first switching signal by reversing the second switching signal.

7. The brake system of claim 1, wherein:
the reference value comprises a plurality of reference values different for each of the at least one second controller.

8. The brake system of claim 7, wherein:
the plurality of reference values are determined based on the stroke of the brake pedal required for a control performed by the at least one second controller.

9. The brake system of claim 1, wherein:
the first controller or the at least one second controller comprises an integrated electric booster (IEB) controller configured to determine whether a brake system is abnormal, and
the IEB controller configured to determine whether the brake system is abnormal based on at least one of the detection signal, an output signal of a pressure sensor configured to detect a change in an oil pressure of a fluid in accordance with movement of a piston of a cylinder in the brake system, or an output signal of a solenoid valve current sensor configured to detect a current flow of a solenoid valve provided at a flow path of the fluid of the brake system.

10. The brake system of claim 1, wherein:
the first controller is an integrated electric booster (IEB) controller configured to: calculate a brake pressure based on the stroke detected from the stroke sensor, and control a pressure in a master cylinder in the vehicle to become the calculated brake pressure; and
the at least one second controller comprises at least one of an integrated central control unit (ICU) configured to control ON/OFF of a stop lamp, an integrated body control unit (IBU) configured to perform a vehicle start control to start the vehicle when the brake pedal is operated, an engine management system (EMS) configured to recognize a switching signal detecting the operation of the brake pedal, to release cruise control execution of the vehicle, and to control an idle stop and go (ISG) function, a shift by wire (SBW) controller configured to unlock shifting of a transmission when the brake pedal is operated, or a vehicle control unit (VCU) configured to integrate functions of the EMS and the SBW controller.

11. The brake system of claim 1, wherein:
the first controller is a foldable pedal controller, and
the at least one second controller comprises at least one of an integrated electric booster (IEB) controller configured to calculate a brake pressure based on the stroke detected from the stroke sensor and control a pressure in a master cylinder in the vehicle to become the calculated brake pressure, an integrated central control unit (ICU) configured to control ON/OFF of a stop lamp, an integrated body control unit (IBU) configured to perform vehicle start controlling to start the vehicle when the brake pedal is operated, an engine management system (EMS) configured to recognize a switching signal detecting the operation of the brake pedal, to release cruise control execution of the vehicle, and to control an idle stop and go (ISG) function, a shift by wire (SBW) controller configured to unlock shifting of a transmission when the brake pedal is operated, or a vehicle control unit (VCU) configured to integrate functions of the EMS and the SBW controller.

12. A brake system for a vehicle, comprising:
a stroke sensor configured to detect a stroke of a brake pedal and output a first channel signal whose duty linearly decreases from a maximum duty to a minimum duty and a second channel signal whose duty linearly increases from the minimum duty to the maximum duty based on a displacement of the stroke of the brake pedal;
a first controller configured to generate a first switching signal transitioning from a high state to a low state and a second switching signal transitioning from a low state to a high state according to a result of comparing at least one of the first channel signal or the second channel signal with a predetermined reference value; and
at least one second controller configured to control an operation of another device in the vehicle based on an operation of the brake pedal upon receiving at least one of the first switching signal or the second switching signal.

13. The brake system of claim 12, wherein:
the first controller is connected to the stroke sensor by wiring to receive the first channel signal and the second channel signal, and the at least one second controller is connected to the first controller by a controller area network (CAN) to receive the first switching signal and the second switching signal.

14. The brake system of claim 12, wherein:
the first channel signal and the second channel signal are in a complementary relation based on a duty of 50%.

15. The brake system of claim 14, wherein:
the predetermined reference value comprises a first reference value and a second reference value in a complementary relation based on the duty of 50%, and
the first controller is configured to generate a first switching signal based on a result of comparing the first channel signal with the first reference value and to generate a second switching signal based on a result of comparing the second channel signal with the second reference value.

16. The brake system of claim 15, wherein:
the first controller is configured to generate the first switching signal based on a result of comparing the first channel signal with the first reference value and to generate the second switching signal by reversing the first switching signal.

17. The brake system of claim 15, wherein:
the first controller is configured to generate the second switching signal based on a result of comparing the second channel signal with the second reference value and to generate a first switching signal by reversing second switching signal.

18. The brake system of claim 12, wherein:
the predetermined reference value comprises a plurality of reference values different for each of the at least one second controller.

19. The brake system of claim 18, wherein:
the plurality of reference values are determined based on the stroke of the brake pedal required for a control performed in the at least one second controller.

20. The brake system of claim 12, wherein:
the first controller or the at least one second controller comprises an integrated electric booster (IEB) controller configured to determine whether the brake system is abnormal, and
the IEB controller is configured to determine whether the brake system is abnormal based on at least one of the first channel signal, the second channel signal, an output signal of a pressure sensor configured to detect a change in an oil pressure of a fluid in accordance with movement of a piston of a cylinder in the brake system, or an output signal of a solenoid valve current sensor configured to detect a current flow of a solenoid valve provided at a flow path of the fluid of the brake system.

* * * * *